Aug. 20, 1935.  J. M. MARTIN ET AL  2,011,866
POULTRY ROOST
Filed Oct. 30, 1933
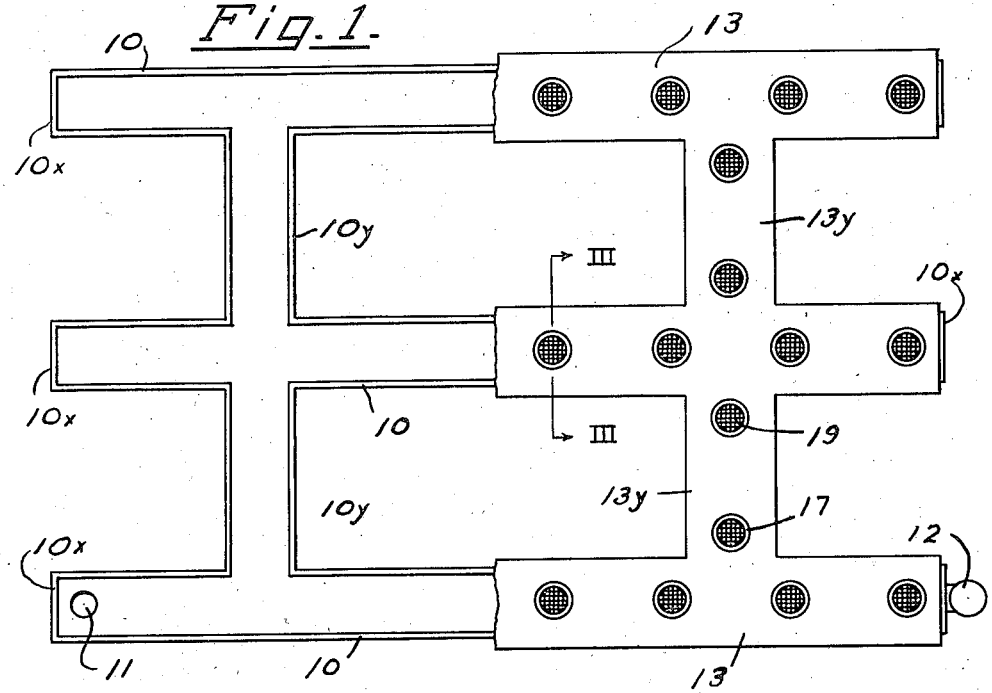
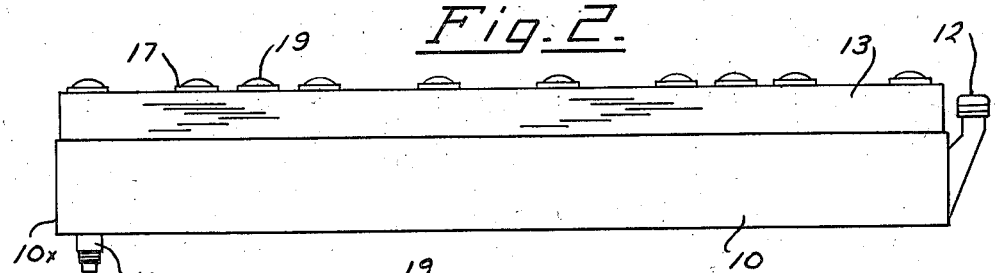
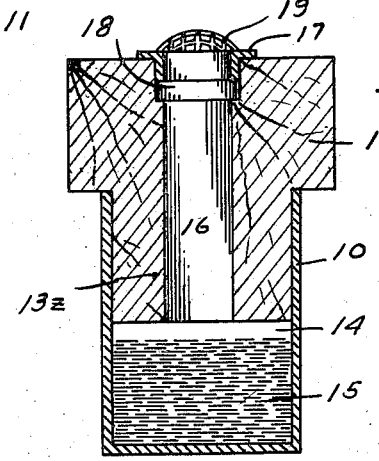
INVENTORS.
John M. Martin
Raymond W. Dowson
BY William C. Edwards Jr
ATTORNEY.

Patented Aug. 20, 1935

2,011,866

UNITED STATES PATENT OFFICE 2,011,866

POULTRY ROOST

John M. Martin, Mulvane, and Raymond W. Dawson, Lawrence, Kans.

Application October 30, 1933, Serial No. 695,760

2 Claims. (Cl. 119—25)

The invention relates to an improvement in poultry roosts tending to prevent diseases and to maintain the normal healthy condition of the fowl and embodies a preferred arrangement of parts later described which may be suspended from the roof of a chicken house, or otherwise supported in a leveled position. The device includes pan means adapted to hold a suitable fluid adapted to give off a gas which upon rising penetrates the feathers of the fowl and acts to destroy lice, mites and the like on the fowl.

In the drawing, Fig. 1 represents a plan view of the chicken roost in accordance with our design with the left hand portion of the roost proper broken away to disclose the supporting pan. Fig. 2 shows a side view of the composite device. Fig. 3 represents a sectional view as taken along the line III—III in Fig. 1 and looking in the direction of the arrows. Similar numerals of reference indicate corresponding parts throughout all the figures of the drawing.

Referring to the drawing; a unit pan structure includes a plurality of longitudinally extending channel-like sheet metal pan elements arranged in rows, spaced apart a proper distance; and a plurality of transverse channel-like pan elements integral with said first mentioned pan elements. The bottom of the unit structure lies in a common plane, the intent being that it shall be suspended or supported in a horizontal plane or so that a desired disinfecting liquid may be poured into a longitudinal pan section through the inlet 12 and circulate freely through the transverse pan elements 10y into the other longitudinal pans 10 and to fill the unit structure to a desired depth as later explained. At 11 is seen a drain plug, normally kept closed, except when it is desired to drain the unit pan structure.

We cover the entire pan structure 10 and 10y with the wooden roost frame 13 and 13y, the upper section preferably overhanging and capping the top of the channels 10 as seen in Fig. 3 and with the lower portion 13z closely filling the upper portion of the pan 10. The fluid 15 which is of a proper mixture of medicinal quality adapted to give off a gas is next admitted through the filler cap 12 leaving a space 14 between the liquid 15 and the bottom of the members 13z for gas circulation. The suspension of the wooden roost frame by the overhanging cap portions serves to establish a definite depth area available for the fluid without the liquid touching the wood elements; this is very desirable as the actual contact of the liquid with the wooden parts, might by capillary action cause the liquid to contact the fowl and render eggs nonfertile. At spaced intervals vertical holes 16 are centrally arranged in the members 13 and 13y, Figs. 1 and 3, these holes at the top are provided with ring like members 17 seated within the enlarged upper part 18 of the hole 16. Integral with the ring 17 is a screen cap such as 19 which is soldered or otherwise affixed to the ring 17 in any well understood manner and the screens for strength and ease of cleaning form a curved cap as seen in Fig. 3.

The spacing of these holes 16 and screens 19 is such that a fowl may seat over the screen, and whereby the gaseous vapor arising from the pan 13 will readily penetrate the feathers and attack and kill mites, lice and the like. When the liquid 15 becomes dirty or has lost its efficiency, it is readily removed through the valve 11, and the pan 13 again refilled.

Such modifications may be employed as lie within the scope of the appended claims. Having fully described our invention, what we now claim as new and desire to secure by Letters Patent is:

1. In roosts of the class described; a unit pan structure arranged in a common plane and comprising a plurality of longitudinally extending channel-like pan elements transversely connected by a plurality of channel-like pan elements; a roost structure comprising longitudinal and transverse members capping and loosely depending within the several pan elements of the unit structure; and vertical passages arranged at spaced intervals in the roost structure and a screen-like cap for each passage.

2. In roosts of the class described; a unit pan-like structure arranged in a common plane and comprising a plurality of longitudinally extending channel-like pan elements, closed at their ends, and transversely connected by a plurality of channel-like pan elements; and a wooden roost comprising a plurality of longitudinally extending members transversely connected by a plurality of transverse members; said roost members capping and loosely depending within the several pan elements of the unit pan structure and having vertical passages arranged at spaced intervals and covered by a screen-like cap; said unit pan structure being adapted to receive a fluid to a depth short of contact with the roost structure substantially as specified.

JOHN M. MARTIN.
RAYMOND W. DAWSON.